Inventor.
William P. Crilly.

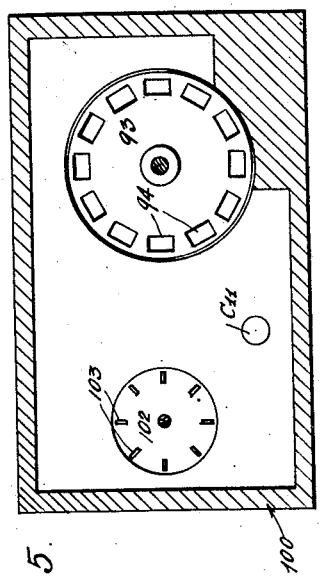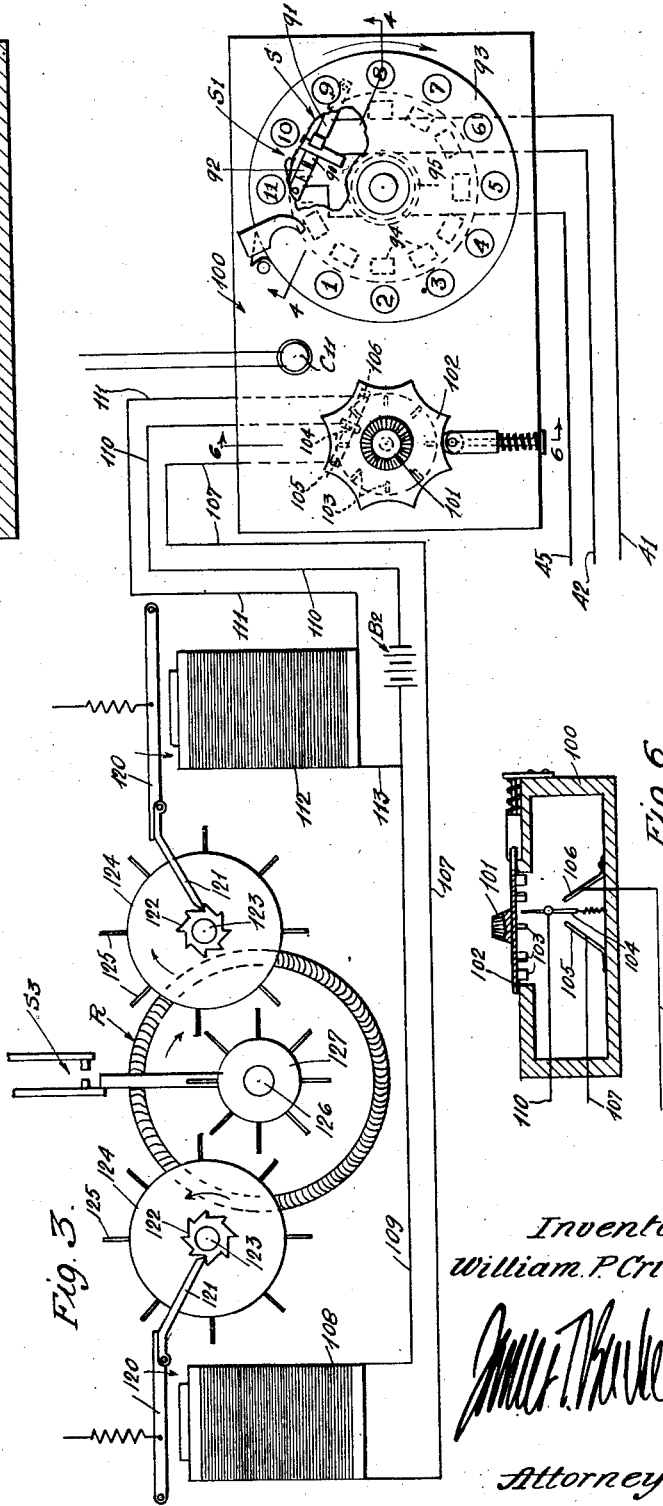

Attorney.

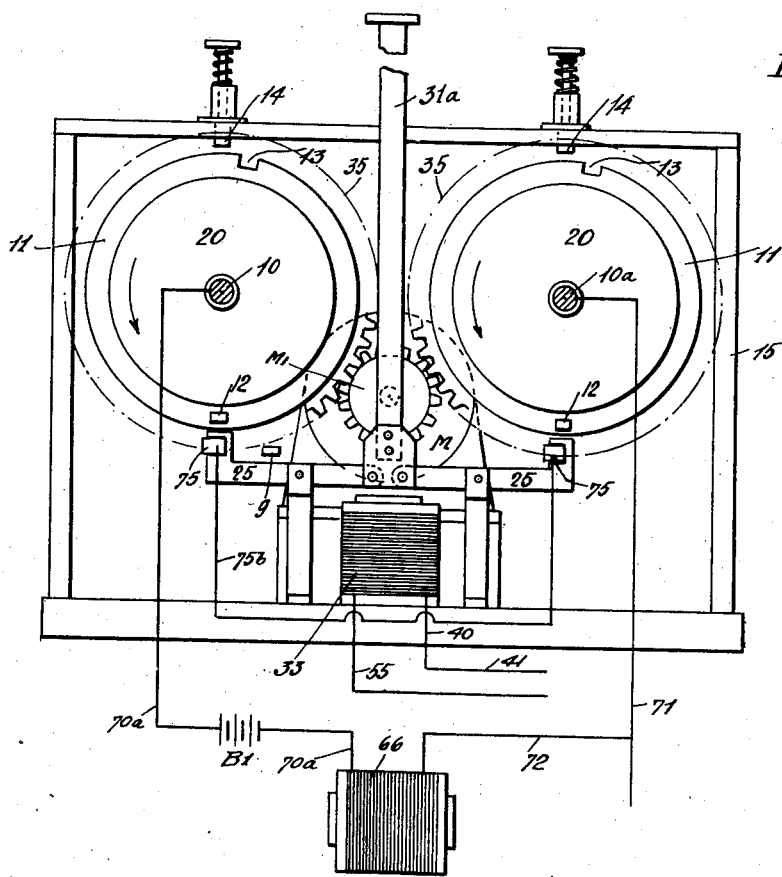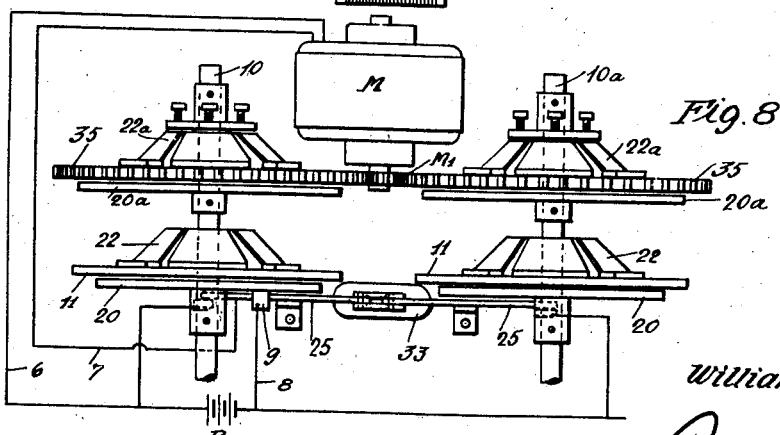

Patented Oct. 10, 1933

1,930,159

UNITED STATES PATENT OFFICE 1,930,159

REMOTE CONTROL SYSTEM FOR RADIO INSTRUMENTS

William P. Crilly, Los Angeles, Calif.

Application October 10, 1928. Serial No. 311,496

23 Claims. (Cl. 250—40)

This invention has relation to controllable setting of instruments such as radio receiving sets, although not necessarily limited to such specific instruments. The general object of the invention is to provide a system whereby such an instrument may be set quickly and accurately and also may be set by control from a distance.

I have preferred to illustrate my invention as applied to a radio-receiving set and will describe it as so applied. From that description the features and characteristics of the invention itself will be readily apparent. As applied to a radio-receiving set the invention first embodies a setting mechanism which is adjustable to any one or more selected settings, and which, after proper setting, may be actuated by a single impulse to set the instrument in the previously selected setting, or in any one of a number of previously selected settings.

The setting mechanism, as briefly described above, is so arranged that it may either be actuated at the instrument itself by manual operation, or may be actuated by selective distance control. A preferred form, described in detail, is an electrical system including first an electrical means for selection and second an electrical means for actuation of the selected part of the setting mechanism. The whole system and apparatus is so constructed and embodied as to make it comparatively simple in structure and installation, and so as to present simple, dependable mode of action through which the desired setting may at all times be obtained regardless of any previous setting. The remote control system also includes electrical means for controlling the radio set as to its " off " and " on " positions, and also as to the degree of amplification.

With the foregoing brief description in mind the invention will now be best understood from a detailed and specific description of the preferred illustrative form, reference for that purpose being had to the accompanying drawings, in which Figure 1 is a perspective diagram of those parts of the apparatus which are normally located at or in the radio set itself.

Fig. 3 is a diagrammatic view showing the manually actuated part of the system and also showing the connection into the amplitude control of the radio set.

Figure 4:
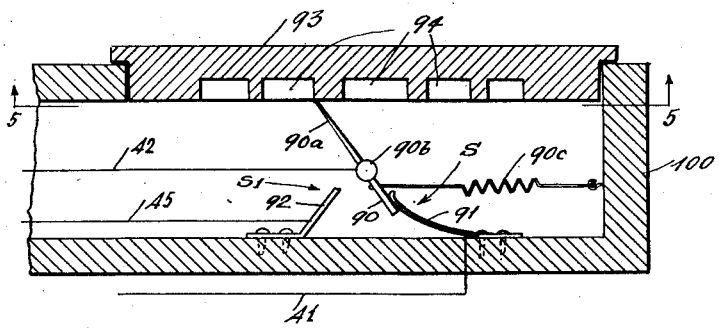
Fig. 4 is a cross section on line 4—4 of Fig. 3.
Figure 4A:
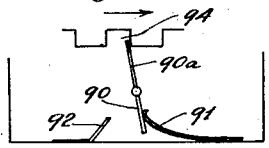
Figure 4B:
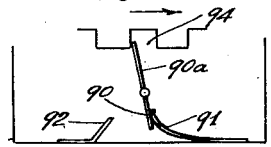
Figure 4C:
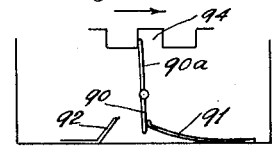
Figure 4D:
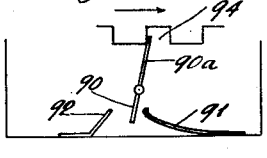
Figure 4E:
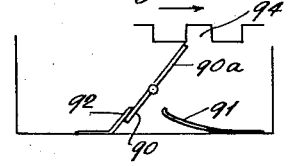
Figure 4F:
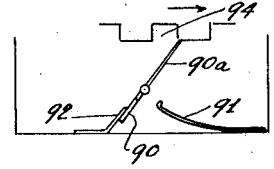

Figs. 4a to 4i inclusive, are diagrams showing the successive operating positions of the switch shown in Fig. 4.

Fig. 5 is a section on line 5—5 of Fig. 4.

Fig. 6 is a section on line 6—6 of Fig. 3.

Fig. 7 is a diagrammatic elevation showing the application of my system to a two-dial radio set, and Fig. 8 is a plan of the same.

Figure 1:
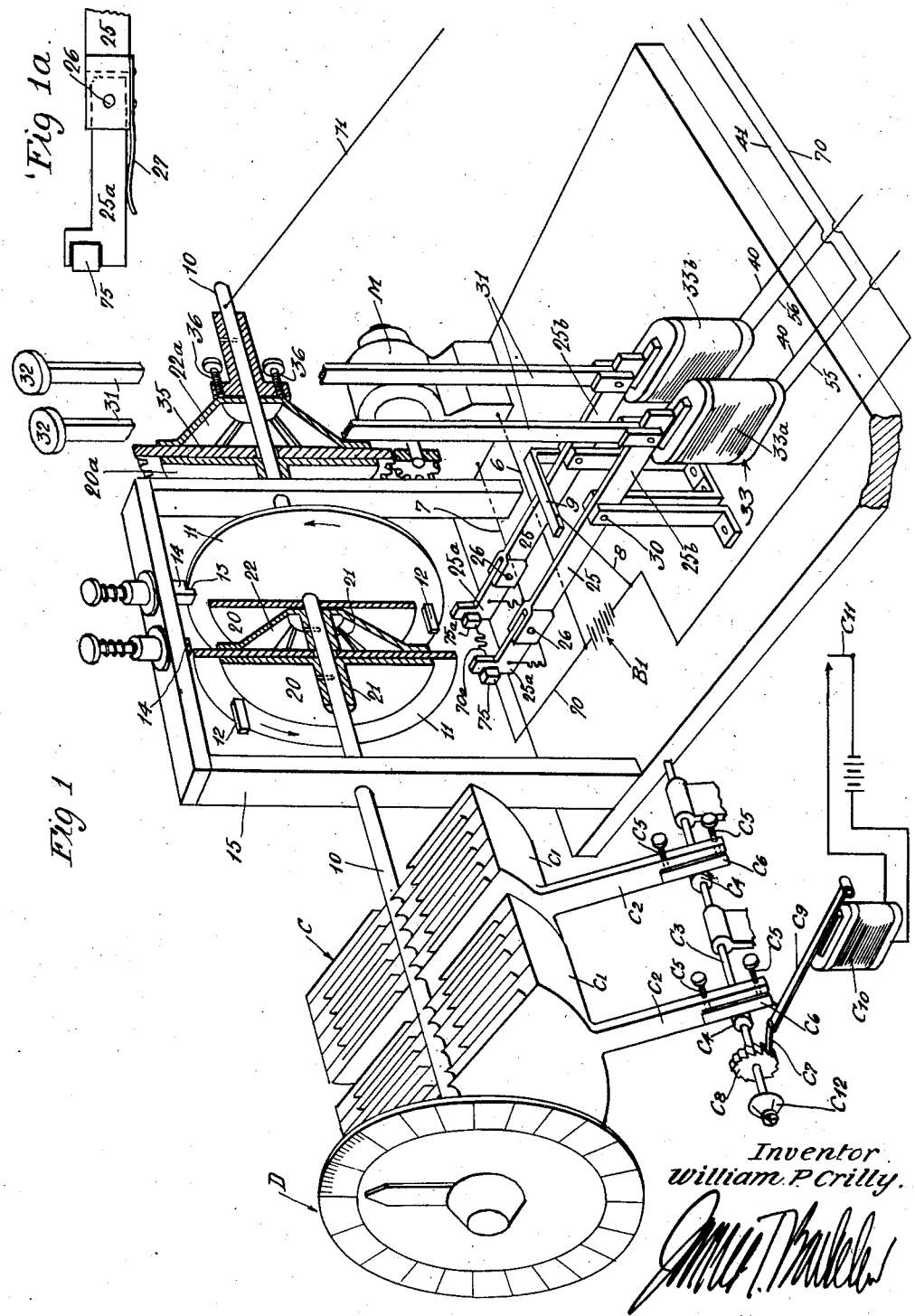
Fig. 1a is an enlarged detail of certain parts of Fig. 1.

In Figure 1 I illustrate more or less diagrammatically a shaft 10 which may be taken to typify the condenser or other tuning element shaft of a typical radio-receiving set, the condensers shown at C typifying the condenser or condensers or other tuning elements of the set. Broadly speaking, of course, the tuning element shaft 10 may or may not directly carry the tuning element or elements of the set, and in the present meaning refers simply to a shaft controlling the tuning of the set. At D is indicated a typical setting dial applied to shaft 10 and by which the condenser of the receiving set is normally adjusted for purposes of setting the radio set to any desired wave length.

In accordance with my invention I mount on shaft 10 one or more stop discs 11, each disc having thereon a stop lug 12, and an opposite notch 13. For the purpose of holding the disc against rotation during the setting adjustment of the mechanism, I may provide any suitable stop means, as for instance, the stop plungers 14. These plungers may be mounted in any suitable part of the radio set; for mere purposes of illustration I have shown the shaft 10 and the stop plungers 14 mounted in a frame 15.

Stop discs 11 are frictionally connected with shaft 10 for rotation therewith. As an illustration of a suitable frictional connection I show a friction disc 20 having a hub 21 mounted tightly on the shaft 10, and bearing against one face of a stop disc 11. Against the other face of the stop disc a split resilient spring or washer 22 forces the stop disc with a suitable pressure against the friction disc 20. The stop discs are thus each individually frictionally mounted upon shaft 10. The amount of friction is sufficient that the shaft 10 with its condensers, etc., will turn with any friction disc when that friction disc is rotated; but the friction is small enough that, by holding the friction disc still, the condenser shaft and condensers may be set by use of dial D in any desired position with relation to the selected friction disc.

Under each friction disc there is a pivoted arm 25 having an outer pivoted end portion 25a which lies under the corresponding friction disc. End portions 25a are pivoted to the main parts of the arm at pivots 26 and a flat spring 27, see Figure 1a, normally holds the end portion 25a up to a position where it is virtually a horizontal continuation of the main arm portion 25, but allows the end portion 25a to swing down with relation to its arm 25 in case the end portion of the arm should, upon upward movement, move up directly under and strike the stop 12 on the friction disc.

Each of stop arms 25 is pivotally mounted, as at 30, and a part 25b of each arm which projects beyond the pivot 30 may have connected therewith a push rod or bar 31 adapted for manual actuation. For instance, these push rods may extend upwardly through the case of the radio set and have push buttons 32 on their upper ends. Thus the arms 25 may be capable of manual actuation at the radio set itself. For electrical or remote actuation of the stop arms 25, I provide under the outer end of each arm a suitable magnet 33. Energization of magnet 33 will attract and move the outer end of the corresponding arm downwardly and cause actuation of the arm.

In whatever manner an arm 25 may be actuated, the following takes place: When the end 25a of arm 25 is raised the energizing circuit to the shaft actuating motor M is closed, causing motor M to rotate the condenser shaft 10, say the direction indicated by the arrows in Figure 1, until the stop 12 on the corresponding stop disc 11 has brought up against end portion 25a of the corresponding stop arm 25, which has been raised high enough to be in the path of the stop 12. The motor circuit is closed by reason of raising any one of the arms 25 and is broken by lowering that arm. Overrun of the motor is taken care of by providing a frictional drive between the motor and shaft 10. For instance that frictional drive may comprise a large gear disc 35 frictionally mounted on shaft 10 by means of a friction plate 20a and a resilient washer 22a, the same as before described, the abutment for the washer 22a in this case being preferably adjustable, by the use of adjustment screws 36, so that the amount of friction between the gear disc 35 and shaft 10 may be adjusted with fair accuracy to be less than the amount of friction between any one stop disc 11 and the shaft 10. The motor M is geared to the gear disc 35; and, due to the relations of the frictions, it will be seen that when any one stop disc 11 is stopped from rotation, frictional slip will take place in the motor drive, leaving the shaft 10 stationary in the position to which it has been brought when the stop 12 of the stop disc has brought up against the raised end of a stop arm 25. As soon as the condenser shaft 10 has thus been brought to a set position, the arm 25 is dropped, breaking the circuit to the motor; and the condensers then remain set in the desired position.

Motor M is energized by the raising of any one of the stop arms 25 and through a circuit which may be supplied with current from a suitable source B1. For instance, I may provide a stationary contact arm 9 which overlies all of the stop arms 25. This stationary contact arm may be connected by a wire indicated at 8 with one side of the source B1. When any one of the stop arms is raised it engages the contact arm 9; thus acting as a switch to close the motor circuit. Each of the stop arms is connected with one side of the motor by a wire 7, and the other side of the motor may be connected by wire 6 with the other side of source B1. Thus the motor is energized as soon as any one of the stop arms 25 is raised and de-energized as soon as that stop arm is lowered.

The manner in which the friction discs 11 are set will be readily understood. The notches 13 are so positioned that they register with the plungers 14 at a position of the disc where stop 12 is in a position bringing up against the end of the corresponding stop arm 25. To adjust any given disc, it is only necessary to depress the corresponding stop plunger 14, turn the dial D until the stop plunger enters the notch 13, and then, while holding the disc still, turn the dial D to set the radio on the desired station. Plunger 14 is then released; and the subsequent automatic operations of bringing the stop disc 11 back to the position in which its stop 12 brings up against the stop arm 25 will then bring the condenser shaft to the previously selected position.

To obtain a fine adjustment of the condensers, by remote control and finer than can be had by the ordinary dial setting, I provide an arrangement as also shown in Fig. 1. The stator parts C1 of the condensers may be adjustable about condenser shaft 10 and have arms C2. An adjusting shaft C3 has eccentrics C4 operating on the arms, so that rotation of the shaft will slightly move the arms, and the condenser stators. Adjustment of the condenser stators with relation to each other may be had by adjusting screws C5 which adjust the positions of shoes C6 or arms C2. Rotation of shaft C3 adjusts the condenser stators, together, relative to the movable parts of the condensers. Rotation of shaft C3 is obtained by the action of a pawl C7 on ratchet C8, pawl C7 being mounted on a pivoted arm C9 which is moved by a magnet C10 controlled by switch C11. Switch C11 is of any suitable type for momentary contact and is preferably mounted in the distant control box hereinafter described. By successive closings of switch C11 the shaft C3 and eccentrics C4 may be ratcheted around until the finest condenser adjustment is obtained.

With the fine adjustment arrangement which has now been described, the new method of tuning is as follows: The knob C12 on the fine adjustment shaft C3 is turned say to a position where the arrow on it points up, which indicates that the cams or eccentrics C4 are in such positions that rotation of the cams will give an adjustment to either side. Then the radio set as shown in Fig. 1 is adjusted for the desired wave length with the usual care. After having made these settings and adjustments the remote control system is then ready to be operated, and the system shown in Figs. 1, 2 and 3 will then act to re-set the radio to the wave length for which it has been adjusted by the previous setting of the dial D. If that wave length has varied a little or if the setting by dial D has not been perfectly accurate, then by using the push button switch C11 the fine adjustment shaft C3 and its cams may be rotated so as to get the fine adjustment which is desired. The sensitiveness of this fine adjustment can be seen from the following example: suppose that shaft C3 is placed 4 inches from the center of the condenser shaft 10. The cams C4 may be made for instance to rock the condenser stator 1/32 of an inch each side of the central position. The ratchet C8 may have say twenty teeth and one operation of the switch C11 then turns the cam a distance which will rock the condenser stator arm C2 at its outer end approximately 1/320 inch. This is equivalent to turning a four inch pointer on a dial about 3/1000 of an inch, which adjustment, it will be recognized, is much more sensitive than anything which can be accomplished with the usual dial setting.

Figure 2:
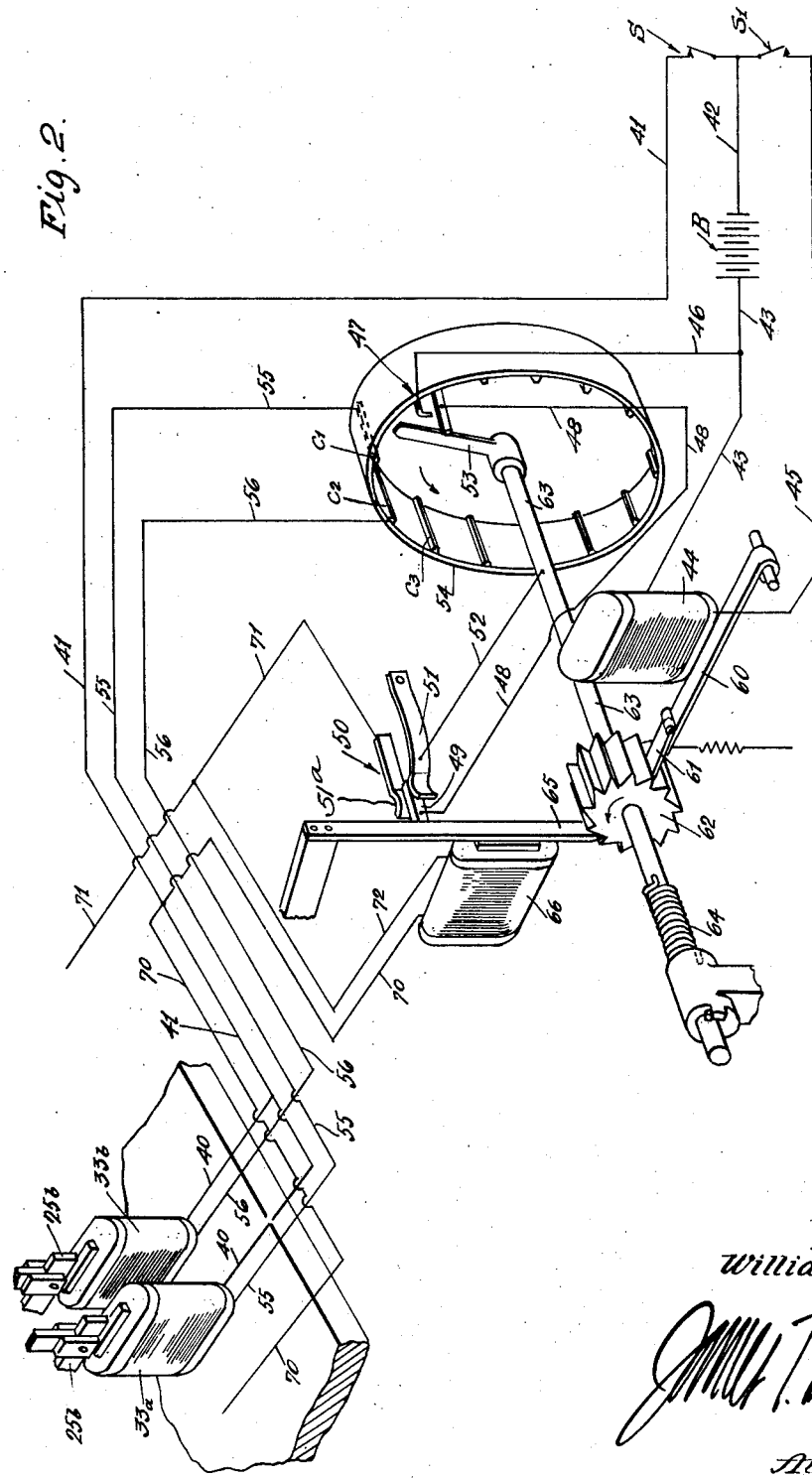
Fig. 2 is a similar diagrammatic view showing the remote control part of the system.

Fig. 2 shows a continuation of the system for remote electrical control. The two magnets 33 and the ends 25b of stop arms 25 are again shown in this figure. It will be understood of course that the number of stop arms and the number of magnets 33 may be as large as desired; two of them suffice to illustrate the invention. Each magnet 33 is connected at one side through a wire 40 with a common conductor 41 which goes directly to the manual control switch S, illustrated in this figure as a simple switch, but shown in detail in Figure 3. The other side of switch S is connected to a common wire 42 which is here shown as supplied with current by a battery B, although any other current supply may be utilized. The other side of the battery B is connected by a wire 43 to one side of a magnet 44, the other side of this magnet 44 being connected by a wire 45 with a switch S1 which is also connected with the common battery wire 42. The switch S1 is also illustrated in simple diagram in Figure 2, its details of construction being shown in Figure 3.

The battery B or other source of current is also connected by a wire 46 with a normally open switch 47, the other side of this normally open switch being connected by a wire 48 with the center contact 49 of a three pole switch 50. The center contact 49 of this three pole switch is normally in contact with the switch contact 51 which is connected by wire 52 with the rotating contact arm 53 of the selective mechanism. This contact arm 53 normally stands in the position indicated in Figure 2 but, by step by step rotation, is adapted to be brought selectively into successive engagement with the several contacts C1, C2, C3, etc., which are here diagrammatically shown as arranged around the inside of a suitable frame 54. Contact C1 is connected by wire 55 with one side of the actuating magnet 33a, and contact C2 is connected by wire 56 with the other illustrated actuating magnet 33b. The connections of further actuating magnets will be understood without the necessity of illustration.

Magnet 44, when energized, moves a pivoted armature 60 upwardly, and a pawl 61 on the end of that armature, acting upon a ratchet wheel 62, rotates the shaft 63 around in the direction indicated by the arrows through one step of movement of the contact arm 53. For instance the first actuation by magnet 44 moves arm 53 from its normal position to its position of engagement with contact C1, the next actuation will move it on to engagement with contact C2, and so on. When arm 53 leaves its normal position, switch 47 closes and remains closed until the arm 53 comes back to its normal position. The contact arm 53 having been put in the selected position by operation of switch S1, then switch S is closed to energize the selected magnet 33 and to raise the selected stop arm 25. A spring, such as illustrated at 64 serves to bring shaft 63 and arm 53 back to the normal position when the ratchet 62 is released. The ratchet 62 is held from backward rotation by a spring detent 65 which normally engages the teeth of ratchet 62 but may be pulled back by energization of magnet 66. This magnet is energized from a circuit which includes the wire 71, to which the magnet is connected at one side by a wire 72, and a wire 70 which leads to a contact mechanism on the several stop arms 25, comprising in essence the switch which is adapted to be closed when any one of the stop discs 11 reaches its final set position. For instance the wire 70 connects (see Fig. 1) with an insulated contact 75 on one of the arms 25; and a similar insulated contact 75a is also connected with wire 70 through the connecting wire 70a. These contacts 75 and 75a are so placed on the arms 25 that they are adapted to be engaged by the corresponding stops 12 when the stops bring up against the ends of the arms. The wire 71 (see Figs. 1 and 2) leads to the shaft 10; thus by closure of the circuit at any one of the contacts 75, the current flow is established from a battery B1 through the wires 70 and 71 and 72, thus energizing magnet 66. Magnet 66 is thus energized only when one of the stop discs has been rotated to its stopped position. Although any other source of current may be used I may prefer to use a source such as B1 at the radio set, as such a source may also be used for energizing motor M, and such an arrangement obviates the necessity of having any extra wires from the battery B which may, if desired, be located at some distance from the radio set; although in many instances it may be desirable to include the whole mechanism shown in Figure 2 in the case of the radio set.

As hereinbefore described, the motor M has been energized by the upward movement of any one of the arms 25; so that as soon as one of the arms 25 is raised to its stop position the motor M is energized and begins to turn the shaft 10, turning that shaft until the corresponding stop 12 comes up against the raised stop arm 25. When this occurs the circuit of magnet 66 is established and that magnet immediately pulls back the detent 65, releasing the rotating contact arm 53 to move back to its normal position under the action of spring 64, and at the same time throwing the center contact 49 of three pole switch 50 out of engagement with contact 51 and into engagement with the contact 51a. During the previous ratcheting action of pawl 61 to turn the ratchet 62 and move contact arm 53 to the selected position, the circuit at 49, 51 has been kept unbroken by the fact that contact 51 is resilient and can follow contact 49 back as far as it, with the detent arm 65, is pushed back by the turning of ratchet 62. Magnet 66, however, pulls the detent arm 65 back further and thus disengages the detent from the ratchet and also moves contact 49 away from contact 51 and into engagement with contact 50. By moving the center contact 49 out of engagement with contact 51, the circuit which was previously established through contact 51 to the magnet 33a or 33b is immediately broken, and thus the arm 53, on its backward movement is prevented from causing energization of any of the magnets 33a or 33b, etc., as it wipes over the contacts C1, etc., on its return movement. At the same time, a circuit is closed through contact 49 and contact 51a, for the purpose of keeping magnet 66 energized, and keeping detent 65 withdrawn during the time that the switch arm 53 is returning to its normal position. It will be remembered that magnet 66 is initially energized by the closure of its circuit at a contact 75, which closure has been effected by energization of a magnet 33. Energization of magnet 33 is cut off immediately when switch contact 49 leaves the contact 51, and the stop arm 25 is thus allowed to drop, breaking the circuit of the magnet 66 at the contact 75. But the movement of detent 65 under the influence of magnet 66 is quick enough that the detent is pulled back to make a contact at 49, 51a, before magnet 66 is deenergized by the dropping of the stop arm 25; and when the contact 49, 51a is made, a circuit is reestablished for magnet 66 from the battery B, through wire 42, switch S, (which is then closed), wire 41, wire 70 (which is connected into wire 41 as shown in the diagram) magnet 66, wire 72, wire 71, contact 51a, contact 49, wire 48, switch 47 (which is then closed) and wires 46 and 43 back to battery B. Thus the energizing circuit of magnet 66 is not finally cut off and the detent 65 does not return to its normal ratchet engaging position until the arm 53 has come back to its normal position shown in Figure 2 and has opened the switch 47. Upon the opening of switch 47, magnet 66 is deenergized and the parts are then all in their normal positions of rest, leaving the radio set adjusted in the desired adjustment. For adjustment to any other wave length, the operations hereinbefore described are merely repeated, the desired setting being selected by the number of times switch S1 is successively closed before switch S is closed for actuating the mechanism to the selective position.

In Figure 2 I have merely diagrammatically illustrated the switches S and S1 in order that a clear description of operation might be given regarding the parts shown in Figures 1 and 2. The remainder of the system, including the detail structure of switches S, S1, is shown in Figures 3 and following. It will be remembered that, for selective operation and control of the radio set, the switch S1 is first successively closed a selected number of times and that switch S is thereafter closed once for a time period long enough to allow the motor M to rotate the condenser shaft to the selected and stopped position. The switch mechanism shown in Figures 3 and following is adapted to perform those switch closing operations.

In Figure 3 the wires 42, 41 and 45 are again shown, these being the same ones which are shown in Figure 2 leading to the switches S, S1; and in Figures 3 and 4 the center wire 42 leads to the center or common contact arm 90 of the two switches S and S1, while the wire 41 leads to the contact 91 of switch S and wire 45 leads to the contact 92 of switch S1. The two switches S and S1 are here shown as combined into what amounts to a three pole switch circuit of which the contacts 91 and 92 constitute the outside contacts and the swinging contact arm 90 constitutes the common center contact.

The center contact arm 90 (see Fig. 4) is pivoted at 90b and has a suitable spring as 90c which normally tends to throw it toward the position of Figure 4 where the switch arm 90 is in engagement with the resilient contact 91 of switch S. Switch arm 90 has an upper extension 90a that wipes the under face of a rotating dial 93 having a series of notches 94 on its under face. The dial may be of the ordinary or typical kind used in telephone systems, adapted to be rotated a selected distance by hand, and then moving back to its normal position by spring action, the spring being indicated at 95 in Figure 3.

Figure 4G:
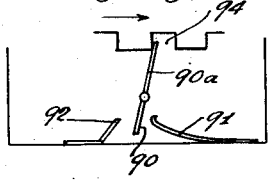
Figure 4I:
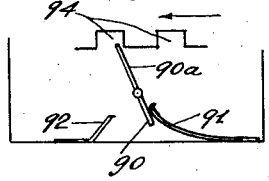
Figure 4H:
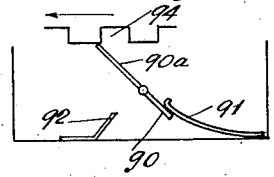

Figure 4 shows the normal position of the dial at rest and in this position it will be seen that the switch arm 90 is thrust over into engagement with contact 91 of switch S and that engagement of the upper end of extension 90a with the under face of the dial keeps the contact closed, as does also spring 90c. Assuming first that the dial is to be moved around by hand in a clockwise direction, as indicated by the arrows in Figures 3 and 4a and following, the switch arm 90 moves through the successive positions which are indicated in Figures 4a, 4b, 4c, 4d, the switch arm in 4d having left engagement with contact 91 and being now moved over toward contact 9a. In the successive positions shown in Figure 4e the switch arm has been moved over into engagement with contact 92 and is kept in that engagement through the position of Figure 4f until the upper arm 90a of the switch arm engages the next dial notch 94 as shown in Figure 4g, when the contact arm 90 moves away from contact 92, momentarily. Then further movement from the position of Figure 4g, in the same direction of dialing, moves contact arm 90 again toward contact 92 of switch S1, the action of the arm being again represented by Figure 4e. Further movement of the dial then carries contact arm 90 again through the position of Figure 4f and back again to the position of Figure 4g. Continued movement of the dial in the direction indicated will thus continue to move contact arm 90 successively through the movements indicated in Figures 4e, 4f, and 4g, causing an intermittent contact, and a successive break, for every dial notch 94 which passes over the upper end of contact arm 90a. Thus, depending upon the distance the dial is moved, a corresponding number of intermittent circuit closures will be made at the switch S1.

When the selected number of intermittent circuit closures has thus been made at switch S1, the dial is allowed to return towards its normal position of Figure 4, under the action of its returning spring 95. Assuming that the last position reached as the dial has been rotated forwardly by hand, as illustrated in Figure 4g, then as the dial moves back under its spring action, the contact arm 90 moves through the position of Figure 4c, Figure 4b and Figure 4a back to the position of Figure 4, where the contact arm 90 is again in full engagement with the resilient contact 91 of switch S. This retrograde action of the switch arm 90, of Figures 4c, 4b, 4a and 4, in the order named, takes place as any one dial notch passes in retrograde movement over the upper end of arm 90a. Then, if there is more than one such dial notch to pass in retrograde movement over the switch arm, as the dial moves back to its normal position of rest, the parts move through the relative positions shown in Figure 4h and Figure 4i, in order. Although the arm 90a, during these movements, moves up into one of the dial notches, the spring 90c keeps switch arm 90 over to the right in engagement with contact 91; and the resiliency of contact 91 is such that it may follow the movements of contact arm 90 and remain in constant engagement with it in spite of its oscillation by the action of the dial notches. Thus, during the advancing movement of the dial 93, the switch S1 is closed and opened a number of times corresponding to the distance through which the dial is moved; and during the immediately succeeding retrograde movement of the dial, the switch S is closed and kept closed, having been open during all the time that switch S1 was being previously operated. In this manner the switch mechanism shown in Figures 3, 4, 4a, etc., performs automatically the operations which have been described in connection with the switches S and S1, as shown diagrammatically in Figure 2. While I have said that the switch S, as shown diagrammatically in Figure 2, may be considered as a normally open switch, what I mean by that is that it is open during the operation of the intermittent switch S1. The fact that switch S is closed at all times when the system is not being operated at all, is of no consequence. During the total inactivity of the system, it is immaterial whether switch S is either closed or open because, with the system at rest, circular switch S is broken at the open switch 47.

In order also to control the radio set as to turning it off and on and as to degree of amplification, I provide, preferably in the same control box 100 (see Fig. 3) and along with the dial 93, another controlling switch device which may be actuated by rotating a knob 101. This knob 101 has a disc 102 having a number of dependent lugs 103. A hanging switch arm 104 is located under the disc and its upper end is adapted to be engaged by the lugs 103 so that, upon rotation of the knob and disc in one direction the switch arm will be thrown into successive short contacts with either a contact 105 or a contact 106, depending upon the direction of rotation of the disc. For instance, right handed rotation will cause intermittent contacts with 105, and will cause intermittent closings of the circuit which include the wire 107 leading from the contact 105 to a magnet 108, the other side of the magnet being connected by a wire 109 with a source of energy as B2, another wire 110 leading from the other side of B2 to the contact arm 104. Likewise left-handed rotation of the disc will intermittently close a circuit including the wire 111 leading from contact 106 to magnet 112, thence through wire 113 to a source B2 and through the common wire 110 to the contact 104. Assuming that the rheostat R, indicated in Figure 3, is to be rotated right-handedly in order first to close the main power switch S3 and then to cut out resistance to increase amplitude, it will be seen that intermittent energizations of magnet 108 will cause such rotation. Magnet 108, when energized draws down an armature 120 which has a pawl 121 engaging a rotating ratchet 122 on shaft 123. Also on this shaft 123 is an element that may be broadly described as a star wheel, composed of a disc 124 having radial pins 125. On the shaft 126 of rheostat R is another star wheel 127 of similar construction. The star wheels interengage in such a manner that rotation of the star wheel 124 will cause corresponding rotation of 127, but so that star wheel 127 may be rotated manually (as when it is desired to adjust the radio by hand, rather than by remote control) without rotating star wheel 124.

From what has been said it will readily be seen how intermittent energizations of magnet 108, which energizations are caused by rotation of knob 101, will rotate star wheel 124 step by step and therefore rotate the rheostat step by step in a right handed direction, first to close the main power switch S3 and thus turn the radio on, and then to adjust the rheostat step by step for increasing the amplification action of the radio set. Reversely, intermittent energization of magnet 112, which is caused by left-handed rotation of knob 101, causes step by step operation of the rheostat in a left handed direction, and finally causes opening of switch S3.

In Figs. 7 and 8 I show the application of my selective system and motor drive arrangement to a two-dial control radio set. In these views two condenser shafts 10 and 10a are illustrated, both driven by a single motor M. In this case the two gear disks 35 are driven from the motor gear M1 in such a manner that both the condenser shafts are driven in the same direction. These gear disks 35 are mounted on the shafts in the same manner as in Fig. 1, being frictionally held between friction disks 20a and the spring washers 22a, and the friction being sufficient to drive the shafts until they are stopped, but insufficient to drive the shafts when a stop lug 12 goes up against the end of a stop arm 25. Stop lugs 12 are, as before, mounted on the stop disks 11 which are frictionally held between the friction plates 20 and the spring washers 22, and the action of each stop arm 25 with relation to its corresponding stop disk is the same as before described. However, the arrangement here comprises an arrangement of stop arms 25 in pairs, both arms of a pair being actuatable by a single magnet 33, this magnet being energized through the circuit 40, 41 and 55, in the same manner as before described. Energization of magnet 33 will therefore throw both the stop arms 25 into an elevated position where each of the stop arms will be contacted by the corresponding stop lug 12 when that lug goes around to the proper position. Energization of motor M may be the same as before described, from the source B1 through the wire 8 that goes to the stationary contact 9 which is engaged by one of the arms 25 when it moves upwardly, the wires 6 and 7 completing the motor circuit and keeping the motor energized as long as an arm 25 is up, which will be as long as magnet 33 is energized. Magnet 33 is kept energized, as will be explained, until both the stops 12 have come up against the contact 75 on the two arms 25; and therefore the motor will keep on operating until both stops 12 are brought into their final set positions, even though one stop 12 comes into its final set position before the other. When stop 12 comes to its final stopped position, then frictional drive of the motor on the corresponding shaft 10 merely slips, allowing the motor to continue running and to continue driving the other shaft 10a until its stop 12 has brought up against the corresponding stop arm, when the motor drive of shaft 10a will begin to slip and continue to slip to take care of the over-run of the motor.

In Fig. 7 the magnet 66 of Fig. 2 is again shown. It will be remembered that in Figs. 1 and 2 this magnet 66 was energized by virtue of any one stop 12 coming up against the corresponding stop arm contact 75, the switch S at that time being closed; and that the energization of magnet 66 thus allows the selective switch arm 53 to return to its normal position, after stop 12 has brought up against stop arm contact 75. In a double dial set it is consequently necessary that magnet 66 not be energized until both stop lugs 12 shall have brought up against both the corresponding stop arm contacts 75; and the circuiting shown in Fig. 7 accomplishes this purpose. In this case the wires 72 and 71 from magnet 66 are shown leading to one of the condenser shafts, as the shaft 10a. The wire 70a, which corresponds to the wire 70 in Figs. 1 and 2, and in which the source B1 is located, is here shown as connecting with the other shaft 10. Suitable means being used in the radio set to insulate the two shafts 10 and 10a from each other, circuit to magnet 66 will in this case only be closed when both stop lugs 12 are in contact with the stop arm lugs 75, the current then flowing through the circuit 70a, shaft 10, stop disk 11, stop lug 12, contact 75, wire 75b, the other contact 75, the other stop lug 12 and its stop disk 11, shaft 10a, and wires 71 and 72 to the magnet 66; the magnet thus being energized only when both stop lugs 12 are in engagement with the contacts 75. Thus, after both the condenser shafts have been brought to the selected and set positions, magnet 66 will then, and then only, be energized to allow the selective switch arm 53 of Fig. 2 to leave the selected contact C1 or C2, etc., and move back to its normal position.

From the foregoing description it will now readily be seen that my system provides first for quick selective setting of a radio set on any previously selected station, and that that setting can, if desired, be done directly at the radio set. The system also provides for the same quick selective setting by remote control. Furthermore, it provides not only remote control for the selective setting, but also provides for remote control of the degree of amplification and also for remote control and fine and accurate adjustment of the condenser settings in order to accurately adjust the radio set for long distance stations where accurate setting is particularly necessary, and also to finely adjust the radio set to any small variations of wave length which occurs from time to time and is more noticeable in long distance transmission. The distant control system which I provide is, in its preferred form, entirely automatic but at the same time is so associated with the radio set that it does not interfere with manual setting of the instrument in the usual way at the set.

I have mentioned the fact that the system does not at all interfere with manual setting of the condenser shafts by the usual manipulation of the dials D1 and it will further be seen from the descriptions that the system does not interfere with the manual setting of amplification by the usual knob operation of the rheostat shaft 126 shown in Fig. 3. And therefore the system does not interfere with manual setting and adjustment of the fine adjustment shaft C3 of Fig. 1, that shaft being adjustable by manual operation in the usual way merely by turning the knob C12 shown in Fig. 1. And all these things are true of my system whether the system be applied to a set having a single dial control of condensers or having a multiple dial control of condensers.

I claim:

1. In a control and setting system for a radio set, which has a tuning element shaft, a motor for rotating said shaft, a frictional driving connection between the motor and the shaft, a plurality of stop lugs each independently rotatively adjustable on said shaft, a corresponding plurality of stop arms, each adapted to be moved between a position where it will be engaged by a stop lug and a position where it will not be engaged by said stop lug, a motor energizing circuit, a switch in said circuit closed by virtue of movement of any one stop arm to its lug engaging position and opened when all the stop arms are in position not to be engaged by the stop lugs, a corresponding plurality of magnets, each magnet adapted to actuate a stop arm to its stop lug engaging position; and energizing circuits for said magnets including a selective system whereby any one of said magnets may be selectively energized; said selective energizing system including a selective switch having a rotary contact arm and a plurality of circularly arranged contacts each of which is connected into the circuit of a stop arm actuating magnet, magnetically actuated ratchet means for moving the rotary arm around step by step, spring means for returning the rotary arm to normal position, a detent in association with the ratchet means and acting to prevent the return spring actuated rotation of the rotating switch arm, a magnet adapted when energized to release said detent, and a circuit for energizing said magnet, said circuit including electrical contacts adapted to be closed by the engagement of any one stop lug with its corresponding stop arm.

2. In a control and setting system for a radio set, which has a tuning element shaft, a motor for rotating said shaft, a frictional driving connection between the motor and the shaft, a plurality of stop lugs each independently rotatively adjustable on said shaft, a corresponding plurality of stop arms, each adapted to be moved between a position where it will be engaged by a stop lug and a position where it will not be engaged by said stop lug, a motor energizing circuit, a switch in said circuit adapted to be closed by movement of any one stop arm to its lug engaging position and adapted to be opened when all the stop arms are in position not to be engaged by the stop lugs, a corresponding plurality of magnets, each magnet adapted to actuate a stop arm to its stop lug engaging position; and energizing circuits for said magnets including a selective system whereby any one of said magnets may be selectively energized; said selective energizing system including a selective switch having a rotary contact arm and a plurality of circularly arranged contacts each of which is connected into the circuit of a stop arm actuating magnet, magnetically actuated ratchet means for moving the rotary arm around step by step, spring means for returning the rotary arm to normal position, a detent in association with the ratchet means and acting to prevent the return spring actuated rotation of the rotating switch arm, a magnet adapted when energized to release said detent, and a circuit for energizing said magnet, said circuit including electrical contacts adapted to be closed by the engagement of any one stop lug with its corresponding stop arm; a switch controlling the circuit of said ratchet actuating magnet, and a switch in the energizing circuit of the stop arm actuating magnets.

3. In a control and setting system for a radio set, which has a tuning element shaft, a motor for rotating said shaft, a frictional driving connection between the motor and the shaft, a plurality of stop lugs each independently rotatively adjustable on said shaft, a corresponding plurality of stop arms, each adapted to be moved between a position where it will be engaged by a stop lug and a position where it will not be engaged by said stop lug, a motor energizing circuit, a switch in said circuit adapted to be closed by movement of any one stop arm to its lug engaging position and adapted to be opened when all the stop arms are in position not to be engaged by the stop lugs, a corresponding plurality of magnets, each magnet adapted to actuate a stop arm to its stop lug engaging position; and energizing circuits for said magnets including a selective system whereby any one of said magnets may be selectively energized; said selective energizing system including a selective switch having a rotary contact arm and a plurality of circularly arranged contacts each of which is connected into the circuit of a stop arm actuating magnet, magnetically actuated ratchet means for moving the rotary arm around step by step, spring means for returning the rotary arm to normal position, a detent in association with the ratchet means and acting to prevent the return spring actuated rotation of the rotating switch arm, a magnet adapted when energized to release said detent, and a circuit for energizing said magnet, said circuit including electrical contacts adapted to be closed by the engagement of any one stop lug with its corresponding stop arm; a switch controlling the circuit of said ratchet actuating magnet, and a switch in the energizing circuit of the stop arm actuating magnets, said last mentioned switches being comprised of a common contact arm and two contacts adapted to be selectively engaged by said common contact arm, and mechanism for causing said common contact arm first to intermittently make engagement with one of said contacts and thereafter to make a single engagement with the other of said contacts.

4. In a setting system for a radio receiving set which set includes an adjustable tuning element shaft, and electrical means for rotating said shaft; a plurality of stop elements frictionally mounted on said shaft for rotative adjustment thereon, a corresponding plurality of selective stop means operable to coact with corresponding stop elements to bring the tuning element shaft to stops in positions determined by the adjustments of the rotatably adjustable stop elements, and adjustment stop means for holding said rotatably adjustable stop elements one at a time in stopping position relative to their corresponding selective stop means while the tuning element shaft is rotated manually to tune in successive broadcasting stations, whereby to accomplish the rotatable adjustment of the several stop elements on the shaft to correspond one to each of said broadcasting stations.

5. In a setting system for a radio receiving set, which set includes an adjustable tuning element shaft, and electrical means for rotating said shaft; a plurality of stop elements frictionally mounted on said shaft for rotative adjustment thereon, a corresponding plurality of selective stop means operable to coact with corresponding stop elements to bring the tuning element shaft to stops in positions determined by the adjustments of the rotatably adjustable stop elements, and means for accomplishing adjustment of the rotatably adjustable stop elements on the shaft, said means comprising a plurality of locking plungers corresponding to said stop elements and each mounted in the set for individual movement into locking engagement with the corresponding stop element to hold that element against rotation, said stop elements being adapted for such locking engagement at points such that a stop element so locked is held in operative stopping position with relation to its corresponding selective stop means during manual adjustment rotation of the tuning element shaft.

6. In a setting system for a radio receiving set, which set includes an adjustable tuning element shaft, and electrical means for rotating said shaft, selective means for stopping said shaft in a predetermined position, said selective means composed of sets of two coacting members, one member on and rotating with the tuning element shaft, the other member adjacent to the path of travel of the first mentioned member, means yieldingly holding one of the coacting members in rotative adjusted position with reference to the tuning shaft axis, and means for temporarily locking the two sets of coacting members in fixed angular stopping relation to each other while the tuning element shaft is rotated manually to tune in a desired broadcast station, to accomplish the adjustment of the yieldingly held coacting member.

7. In a setting system for a radio receiving set, which set includes an adjustable tuning element shaft; means for rotating the shaft, a plurality of adjustable stop means for stopping rotation of the shaft when said shaft is in predetermined selected positions, said stop means being selectively actuatable into operative stopping position, a corresponding plurality of magnets, each magnet adapted to actuate a stop means to operative stopping position; and energizing circuits for said magnets including a selective system whereby any one of said magnets may be selectively energized; said selective energizing system including a selective switch having a rotary contact arm and a plurality of circularly arranged contacts each of which is connected into the circuit of a stop means actuating magnet, magnetically actuated ratchet means for moving the rotary arm around step-by-step, spring means for returning the rotary arm to normal position, a detent in association with the ratchet means and acting to prevent the return spring actuated rotation of the rotating switch arm, a magnet adapted when energized to release said detent, a circuit for energizing said magnet, and a switch in said circuit arranged to be closed by actuation by the rotating shaft when the shaft reaches a position to be stopped by any selected stop means actuated to operative stopping position.

8. In a setting system for a radio receiving set, which set includes an adjustable tuning element shaft; means for rotating the shaft, a plurality of adjustable stop means for stopping rotation of the shaft when said shaft is in predetermined selected positions, said stop means being selectively actuatable into operative stopping position, a corresponding plurality of magnets, each magnet adapted to actuate a stop means to operative stopping positions; and energizing circuits for said magnets including a selective system whereby any one of said magnets may be selectively energized; said selective energizing system including a selective switch having a rotary contact arm and a plurality of circularly arranged contacts each of which is connected into the circuit of a stop means actuating magnet, magnetically actuated ratchet means for moving the rotary arm around step-by-step, spring means for returning the rotary arm to normal position, a detent in association with the ratchet means and acting to prevent the return spring actuated rotation of the rotating switch arm, a magnet adapted when energized to release said detent, a circuit for energizing said magnet, and a switch in said circuit arranged to be closed by actuation by the rotating shaft when the shaft reaches a position to be stopped by any selected stop means actuated to operative stopping position; a switch controlling the circuit of said ratchet actuating magnet, and a switch in the energizing circuit of the stop means actuating magnets.

9. In a setting system for a radio receiving set, which set includes an adjustable tuning element shaft; means for rotating the shaft, a plurality of adjustable stop means for stopping rotation of the shaft when said shaft is in predetermined selected positions, said stop means being selectively actuatable into operative stopping position, a corresponding plurality of magnets, each magnet adapted to actuate a stop means to operative stopping positions; and energizing circuits for said magnets including a selective system whereby any one of said magnets may be selectively energized; said selective energizing system including a selective switch having a rotary contact arm and a plurality of circularly arranged contacts each of which is connected into the circuit of a stop means actuating magnet, magnetically actuated ratchet means for moving the rotary arm around step-by-step, spring means for returning the rotary arm to normal position, a detent in association with the ratchet means and acting to prevent the return spring actuated rotation of the rotating switch arm, a magnet adapted when energized to release said detent, and a circuit for energizing said magnet, said circuit including a switch arranged to be closed by actuation by the rotating shaft when the shaft reaches a position to be stopped by any selected stop means actuated to operative stopping position; a switch controlling the circuit of said ratchet actuating magnet, and a switch in the energizing circuit of the stop means actuating magnets, said last mentioned switches being comprised of a common contact arm and two contacts adapted to be selectively engaged by said common contact arm, and mechanism for causing said common contact arm first to intermittently make engagement with one of said contacts and thereafter to make a single engagement with the other of said contacts.

10. In a setting system for a radio receiving set, which set includes an adjustable tuning element shaft; means for rotating the shaft, a plurality of adjustable stop means for stopping rotation of the shaft when said shaft is in predetermined selected positions, said stop means being selectively actuatable into operative stopping position, a corresponding plurality of magnets, each magnet adapted to actuate a stop means to operative stopping positions; and energizing circuits for said magnets including a selective system whereby any one of said magnets may be selectively energized; said selective system including a selective switch adapted to close the circuits of selected stop means magnets, magnetically actuated ratchet means for setting said selective switch to close a selected one of the circuits of said stop means magnets, a circuit for energizing said magnetically actuated ratchet means, a switch controlling said last mentioned circuit, means for returning the selective switch to normal position, a detent in association with the ratchet means and acting to prevent the return of the selective switch to normal position, a magnet adapted when energized to release said detent, a circuit for energizing said magnet, a switch in said circuit arranged to be closed by actuation by the rotating shaft when the shaft reaches a position to be stopped by any selected stop means actuated to operative stopping position, and a switch controlling the energizing circuits of the stop means magnets.

11. In a setting system for a radio receiving set, which set includes an adjustable tuning element shaft, means for rotating the shaft, a plurality of adjustable stop means for stopping rotation of the shaft when said shaft is in predetermined selected positions, said stop means being selectively actuatable into operative stopping position, a corresponding plurality of magnets, each magnet adapted to actuate a stop means to operative stopping position; and energizing circuits for said magnets including a selective system whereby any one of said magnets may be selectively energized; said selective system including a selective switch adapted to close the circuits of selected stop means magnets, magnetically actuated ratchet means for setting said selective switch to close a selected one of the circuits of said stop means magnets, a circuit for energizing said magnetically actuated ratchet means, a switch controlling said last mentioned circuit, means for returning the selective switch to normal position, a detent in association with the ratchet means and acting to prevent the return of the selective switch to normal position, a magnet adapted when energized to release said detent, a circuit for energizing said magnet, a switch in said circuit adapted to be closed by actuation by the rotating shaft when the shaft reaches a position to be stopped by any selected stop means actuated to operative stopping position, another circuit for energizing said magnet, a switch in the last mentioned circuit opened by virtue of the selective switch occupying normal position; a switch controlling the circuit of the ratchet actuating magnet, and a switch in the energizing circuit of the stop means actuating magnets.

12. In a selective setting system for a radio receiving set, which set includes an adjustable tuning element shaft; an electric motor for rotating said shaft, a frictional driving connection between said motor and said shaft adapted to permit over run of the motor when the shaft is held, a plurality of rotatably adjustable stop members carried by the shaft, a corresponding plurality of stops selectively actuatable to move from inoperative position into operative position to be engaged by and positively stop corresponding shaft carried stops, a plurality of electrical circuits adapted to be selectively operated to move selected stops into operative shaft stopping position and to energize the motor to start shaft rotation, and an electrical circuit formed by the engagement of a shaft-carried stop member with the stop previously selected and moved to operative position, to cause de-energization of the motor.

13. In a selective setting system for a radio receiving set, which set includes an adjustable tuning element shaft; an electric motor for rotating said shaft, a frictional driving connection between said motor and said shaft and adapted to permit over run of the motor when the shaft is held, a plurality of rotatably adjustable stop members carried by the shaft, a corresponding plurality of stops selectively actuatable to move from inoperative position into operative position to be engaged by and positively stop corresponding shaft-carried stops, a plurality of electrical circuits adapted to be selectively operated to move selected stops into operative position and to energize the motor to start shaft rotation, an electrical contact carried by each shaft-carried stop member, another electrical contact corresponding to each of said first named contacts and adapted to make with its corresponding contact when the corresponding shaft carried stop member engages its stop, and an electrical circuit formed by closure of said contacts and adapted to cause de-energization of the motor.

14. In a selective setting system for a radio receiving set, which set includes an adjustable tuning element shaft; an electric motor for rotating said shaft, a plurality of rotatably adjustable stop members carried by the shaft, a corresponding plurality of stops selectively actuatable to move from inoperative position into operative position to be engaged by and positively stop corresponding shaft carried stops, a plurality of electrical circuits adapted to be selectively operated to move selected stops into operative shaft stopping position and to energize the motor to start shaft rotation, and an electrical circuit formed by the engagement of a shaft-carried stop member with the stop previously selected and moved to operative position, to cause de-energization of the motor.

15. In a selective setting system for a radio receiving set, which set includes an adjustable tuning element shaft; an electric motor for rotating said shaft, a plurality of rotatably adjustable stop members carried by the shaft, a corresponding plurality of stops selectively actuatable to move from inoperative position into operative position to be engaged by and positively stop corresponding shaft-carried stops, a plurality of electrical circuits adapted to be selectively operated to move selected stops into operative position and to energize the motor to start shaft rotation, an electrical contact carried by each shaft-carried stop member, a corresponding electrical contact carried by each of said selectively actuatable stops and adapted to make with its corresponding contact when the corresponding shaft carried stop member engages its stop, and an electrical circuit formed by closure of said contacts and adapted to cause de-energization of the motor.

16. In a setting system for a radio receiving set, which set includes an adjustable tuning element shaft, means for rotating the shaft, a plurality of adjustable stop means for stopping rotation of the shaft when said shaft is in predetermined selected positions, said stop means being selectively actuatable into operative stopping position, a corresponding plurality of magnets, each magnet adapted to actuate a stop means to operative stopping position; and energizing circuits for said magnets including a selective system whereby any one of said magnets may be selectively energized; said selective system including a selective switch adapted to close the circuits of selected stop means magnets, means for returning the selective switch to normal open position, means normally holding said selective switch against said returning means, electromagnetic means for releasing said holding means, and an energizing circuit for said electro-magnetic means including a switch closed by actuation by the rotating shaft when the shaft reaches a position to be stopped by a selected stop means actuated to operative stopping position.

17. In a setting system for a radio set, which set includes an adjustable tuning element shaft, a motor for rotating said shaft, a plurality of adjustable stop means for stopping rotation of the shaft when the shaft is in predetermined selected positions, said stop means being arranged to take normally a position out of stopping position, but being selectively actuatable into operative stopping position, an energizing circuit for said motor held closed by virtue of any one of said stop means occupying stopping position, a plurality of electro-magnets corresponding to said plurality of stop means, each magnet adapted to actuate a stop means to operative stopping position, and energizing circuits for said magnets including a selective system whereby any one of said magnets may be selectively energized; said selective system including a selective switch adapted to close any selected one of the circuits of the stop means magnets, means for returning said selective switch to normal open position, means normally holding said selective switch against said returning means, electro-magnetic means for releasing said holding means, and an energizing circuit for said electro-magnetic means including a switch closed by actuation by the rotating shaft when the shaft reaches a position to be stopped by a selected stop means actuated to operative stopping position.

18. In a selective setting system for a radio receiving set, which set includes an adjustable tuning element shaft; electrical shaft rotating means, a plurality of stop members carried by the shaft, a corresponding plurality of stops selectively actuatable to move from inoperative position into operative position to be engaged by and positively stop corresponding shaft carried stops, an electrical selective system for selectively controlling said selective stops to move into operative stopping position, switch means for the electrical shaft rotating means closed by any selected stop in moving to operative shaft stopping position and opened by said stop returning to inoperative position, and means for automatically causing the selected stop element to return to inoperative position upon engagement of said selected stop by its corresponding shaft carried stop member.

19. In a selective setting system for a radio receiving set, which set includes an adjustable tuning element shaft; electrical shaft rotating means, a plurality of stop members carried by the shaft, a corresponding plurality of stops selectively actuatable to move from inoperative position into operative position to be engaged by and positively stop corresponding shaft carried stops, an electrical selective system for selectively controlling said selective stops to move into operative stopping positions, switch means for the electrical shaft rotating means closed by action of any selected stop in moving to operative shaft stopping position and opened by said stop returning to inoperative position, and an electrical circuit formed by the engagement of a shaft carried stop with a selected stop moved to operative stopping position, said circuit including means controlling said selective system to return the selected stop to inoperative position.

20. In a selective setting system for a radio receiving set, which set includes an adjustable tuning element shaft; electrical means for rotating the shaft, a multiplicity of selective stop means for stopping rotation of said shaft in predetermined positions by coaction with the shaft, said selective stop means having individual energizing circuits, a bank of electrical contacts connected to one side of respective energizing circuits, a contact member for said bank of contacts connected to the other side of said energizing circuits, a source of electrical energy in said circuits, electrical step by step means for moving said contact member from open position over said bank of contacts, means for returning said member to open position, catch means for normally holding said member against return to open position, electrical release means for releasing said catch means, and an electrical energizing circuit for said release means, said circuit formed through the selective stop means as it coacts with the shaft in stopping rotation of the shaft.

21. In a selective setting system for a radio receiving set, which set includes an adjustable tuning element shaft; electrical means for rotating the shaft, a multiplicity of selective stop means for stopping rotation of said shaft in predetermined positions by coaction with the shaft, said selective stop means having individual energizing circuits, a bank of electrical contacts connected to one side of respective energizing circuits, a contact member for said bank of contacts connected to the other side of said energizing circuit, a source of electrical energy in said circuits, electrical step by step means for moving said contact arm from open position over said bank of contacts, means for returning said arm to open position, catch means for normally holding said arm against return to open positions, electrical release means for releasing said catch means, and an electrical energizing circuit for said release means, said circuit closed by the selective stop means when it coacts with the shaft as the shaft reaches stopping position.

22. In a selective setting system for a radio receiving set, which set includes an adjustable tuning element shaft; electrical means for rotating the shaft, a multiplicity of selective stop means for stopping rotation of said shaft in predetermined positions by coaction with the shaft, said selective stop means having individual energizing circuits, a bank of electrical contacts connected to one side of respective energizing circuits, a contact member for said bank of contacts connected to the other side of said energizing circuits, a source of electrical energy in said circuits, electrical step by step means for moving said contact arm from open position over said bank of contacts, means for returning said arm to open position, catch means for normally holding said arm against return to open positions and electrical release means for releasing said catch means upon stoppage of the shaft by said selective stop means.

23. In a selective setting system for a radio receiving set, which set includes an adjustable tuning element shaft, electrical means for rotating the shaft, a plurality of friction discs spaced along and rigidly mounted on said shaft, a like plurality of stop discs rotatably mounted on the shaft and lying adjacent corresponding friction discs, resilient means forcing said stop discs into frictional engagement with said friction discs, whereby said stop discs are yieldingly held against rotation on said shaft but may be rotatably adjusted thereon, and selective means cooperable with said stop discs to stop rotation of the shaft in positions determined by the rotative adjustments of the stop discs on the shaft.

WILLIAM P. CRILLY.